US007426100B2

(12) United States Patent
Neveu et al.

(10) Patent No.: US 7,426,100 B2
(45) Date of Patent: Sep. 16, 2008

(54) DRIVE KINEMATICS IN A HYBRID CIRCUIT-BREAKER

(75) Inventors: Andre Neveu, Villeurbanne (FR); Andre Cimala, Villeurbanne (FR); Alain Girodet, Chassieu (FR); Mehdi Lebiad, Lyons (FR); Gwenael Marquezin, Villeurbanne (FR)

(73) Assignee: Areva T&D SA, Paris (FR)

( * ) Notice: Subject to any disclaimer, the term of this patent is extended or adjusted under 35 U.S.C. 154(b) by 394 days.

(21) Appl. No.: 11/255,008

(22) Filed: Oct. 21, 2005

(65) Prior Publication Data

US 2006/0091112 A1 May 4, 2006

(30) Foreign Application Priority Data

Oct. 27, 2004 (FR) .................................. 04 52457

(51) Int. Cl.
*H02H 3/00* (2006.01)

(52) U.S. Cl. ..................................................... 361/115

(58) Field of Classification Search .................. 361/115
See application file for complete search history.

(56) References Cited

U.S. PATENT DOCUMENTS

| | | | |
|---|---|---|---|
| 3,560,682 A | 2/1971 | Kohler et al. | |
| 3,891,893 A | 6/1975 | Thaler | |
| 4,814,559 A | 3/1989 | Stegmueller | |
| 5,029,301 A * | 7/1991 | Nebon et al. | 335/16 |
| 5,901,025 A * | 5/1999 | Takahashi et al. | 361/93.4 |
| 5,905,242 A | 5/1999 | Bernard et al. | |
| 6,489,581 B2 * | 12/2002 | Ozil et al. | 218/61 |
| 6,593,538 B2 | 7/2003 | Perret et al. | |
| 6,849,819 B2 * | 2/2005 | Tresy et al. | 218/3 |
| 7,199,324 B2 * | 4/2007 | Perret | 218/3 |
| 2001/0002664 A1 | 6/2001 | Stechbarth et al. | |
| 2003/0089682 A1 | 5/2003 | Skarby et al. | |
| 2004/0004796 A1 | 1/2004 | Tresy et al. | |
| 2005/0211675 A1 | 9/2005 | Perret | |
| 2005/0247677 A1 | 11/2005 | Perret | |

FOREIGN PATENT DOCUMENTS

| | | | |
|---|---|---|---|
| CH | 549 276 | A | 5/1974 |
| EP | 1 310 970 | A1 | 5/2003 |
| EP | 1 580 783 | A | 9/2005 |
| EP | 1 583 124 | A | 10/2005 |
| FR | 894 404 | A | 12/1944 |
| FR | 2 744 284 | A1 | 8/1997 |
| FR | 2 840 729 | | 12/2003 |
| GB | 567 359 | | 2/1945 |

* cited by examiner

*Primary Examiner*—Stephen W Jackson
(74) *Attorney, Agent, or Firm*—Oblon, Spivak, McClelland, Maier & Neustadt, P.C.

(57) ABSTRACT

A device for the actuation of the movable contacts of a hybrid circuit breaker allows the following time diagram to be implemented: command the opening of the interrupting chamber, offset the opening of the vacuum switch so as to allow the interrupting chamber contacts to separate at a minimum speed and in a way that is synchronous with the separation of the vacuum switch contacts, close the vacuum switch while keeping the interrupting chamber in the open position. Moreover, closing the interrupting chamber does not act upon the contacts of the vacuum switch.

31 Claims, 9 Drawing Sheets

DRIVE KINEMATICS IN A HYBRID CIRCUIT-BREAKER

TECHNICAL FIELD

The invention relates to the field of the actuation by means of a single command of the movable contacts of two current-breaking units. More specifically, the interrupting chamber and the vacuum switch of a hybrid circuit breaker are actuated according to the invention by means of a single mechanical layout, even though the movable contacts of each of the cut-out switches follow their own profile of displacement in time, and even though in particular the vacuum switch is protected when the interrupting chamber is opened.

In particular, the invention relates to a hybrid circuit breaker in which the movable contact actuation means allow the simultaneous opening of the interrupting chamber and the vacuum switch followed by the early closure of the envelope relative to the reactivation of the interrupting chamber.

PRIOR ART

A cut-out switch device of the hybrid type involves two different interrupt techniques. A mixed interrupt of this kind is applied particularly in respect of a cut-out switch device for high and medium voltage which comprises a vacuum cut-out switch without any dielectric gas, also known as a "vacuum switch", and a cut-out switch containing a dielectric gas, called an "interrupting chamber".

Each of the cut-out switches includes a pair of arcing contacts movable between a closed current-passing position and an open position. Actuation means allow the contacts to move.

The most straightforward layout is a longitudinal alignment of the pairs of contacts, a shaft allowing the vacuum switch contacts to separate simultaneously with the separation of the gas switch contacts, sometimes slightly offset relative to the opening command signal, as described in the document FR-A-2 840 729.

It has also been envisaged to have the gas interrupting chamber and the vacuum switch on two inclined axes: the movable contact of the interrupting chamber is extended by a longitudinal drive layout on which is placed, in permanent contact and at an angle, a longitudinal component connected to the movable contact of the vacuum switch. A single command acts upon the movable contact of the interrupting chamber in translation along its axis, the length and shape of the drive layout ensuring synchronisation between the displacements of the movable contacts from a closed position to an open position and vice versa. Such a layout is described in the document EP-A-1 310 970.

However, with known layouts, once the movable contacts of the interrupting chamber and the vacuum switch are in the open position, the two cut-out switches remain in this open position so long as a closure command has not been issued. In fact, in the open position, the movable contacts and the loaded parts that are integral with them form a so-called floating potential unit liable to damage the circuit breaker, in particular when the voltage at the circuit breaker terminals is substantial. This may lead to restrikes, but above all needlessly subjects the vacuum switch to dielectric constraints.

DISCLOSURE OF THE INVENTION

The principal objective of the invention is to overcome this drawback of existing high or medium voltage hybrid circuit breakers. More generally, the invention relates to a mechanism for the actuation of two movable contacts able to follow a preset sequence of opening and closing the contacts.

Under one of its aspects, the invention proposes a unipolar or multipolar hybrid circuit breaker including, for each pole, two cut-out switches in series, each including a pair of contacts movable between open and closed positions. Preferably, one of the switches is a dielectric gas interrupting chamber comprising a first contact, usually fixed, and a second movable contact placed longitudinally to a first axis and the first contact of which is connected to a first terminal of a network in which the circuit breaker is placed, the other cut-out switch being a vacuum switch comprising a fixed contact and a movable contact placed longitudinally along a second axis and the fixed contact of which is connected to a second network terminal. Preferably, the first axis is distinct from the second.

Actuation means, through a single command during the circuit breaker opening phase, displace the movable contacts between an open position and a closed position, said actuation means including a layout that allows the movable contact of one of the cut-out switches, in particular the vacuum switch, to close, by means of said single command, while the other cut-out switch, namely the interrupting chamber, remains in the open position. According to another aspect, and possibly in combination, these actuation means can be arranged so as to allow the still open cut-out switch to close while not modifying the closed position of the other.

The vacuum switch is closed by the same single command as the opening and closing of the interrupting chamber, thus allowing a particularly optimised command layout.

According to one particular and preferred embodiment, the movable contacts of the two cut-out switches are displaced in substantially perpendicular directions.

To advantage, the actuation means are equipped with action delaying means making it possible to fulfill the function of opening the vacuum switch a few milliseconds from that of the interrupting chamber, preferably 3 ms after the command to trigger the circuit breaker.

Preferably, a assisted closure mechanism is placed substantially along the axis of the second cut-out switch to promote the closure thereof while the first cut-out switch remains in the open position. This layout may include, for example, a mechanical spring independent of the actuation means as such. Furthermore, closure cushioning means may also be provided.

According to one preferred application, the circuit breaker in accordance with the invention is constituted by a number of metal or insulating sheaths filled with a dielectric gas at a controlled atmosphere.

Different embodiments of the actuation means are possible. In particular the second cut-out switch may be acted upon by means of a pawl or a ramp fastened to an extension of the first contact movable in translation, or by a gear system.

BRIEF DESCRIPTION OF THE DRAWINGS

The characteristics and advantages of the invention will be better understood from reading the following description with reference to the appended drawings, given by way of example and in no way restrictively.

DETAILED DISCLOSURE OF PARTICULAR EMBODIMENTS

Figure 1:
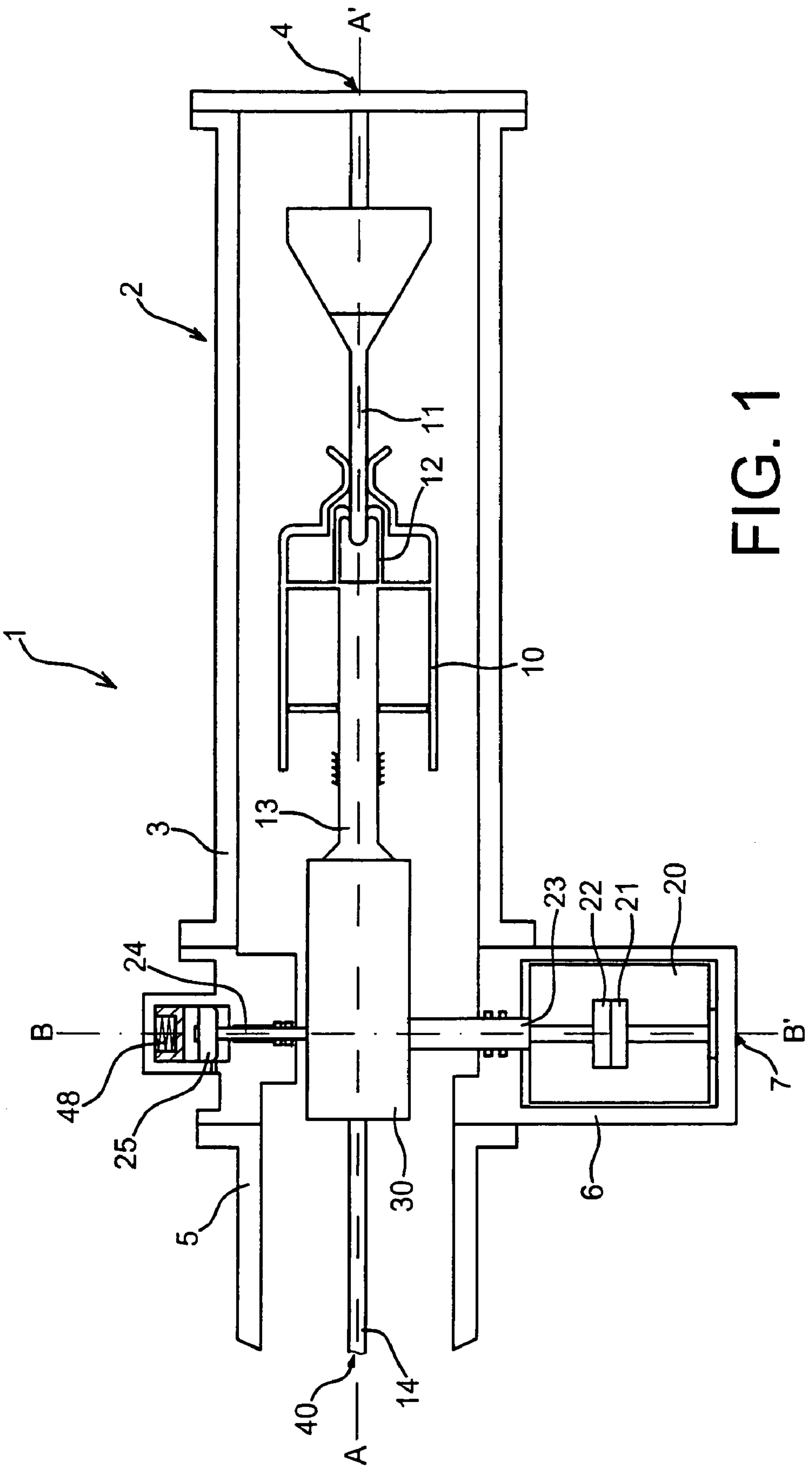
FIG. 1 shows in a general way a hybrid circuit breaker.

As shown in the diagram in FIG. 1, a hybrid circuit breaker 1 includes a sheath 2. According to a preferred embodiment, the sheath 2 delimits a volume filled with dielectric gas at a controlled atmosphere. Although this is not mandatory, the sheath 2 may be made up of a number of parts: a chamber insulator 3 connected, through a metal cover, to a first terminal 4 of the network and an insulator 5 on the support side, these two parts of the sheath 2 being connected to each other by means of an intermediate housing 6, made of metal for example, connected to a second terminal 7 of the network. Other configurations and materials are possible.

The circuit breaker shown contains a single pole, but it is evident that the layout described hereinafter can be repeated for each pole in the case of a multipolar circuit breaker.

Inside the chamber insulator 3 is found a first cut-out switch, called a gas switch, constituted by a dielectric gas interrupting chamber 10, for example $SF_6$ or nitrogen or any other pressurised dielectric gas. An interrupting chamber 10 of this kind comprises a first contact 11, usually fixed, connected to the first terminal 4 of the network, and a second contact 12 movable longitudinally along a first axis AA' relative to the first contact 11. This interrupting chamber 10 is connected electrically in series, inside the intermediate housing 6, with a second cut-out switch constituted by a vacuum switch 20. The vacuum switch 20 comprises a contact 21, usually fixed, connected to the second terminal 7 and a contact 22 movable relative to the first contact 21 longitudinally along a second axis BB'. Preferably, the two axes AA' and BB' are substantially at right angles one relative to the other.

Each of the movable contacts 12, 22 is integral with a longitudinal shaft 13, 23 placed along its displacement axis AA', BB'. The shafts 13, 23 connect the movable contacts 12, 22 to actuation means 30 which, under the action of a single command system 40, displace the movable contacts 12, 22 between an open position of each cut-out switch 10, 20, and a closed position, and vice versa. The command system 40 may act from the outside of the sheath 2 upon a insulating rod, or connecting rod, 14 extending the shaft 13 of the interrupting chamber 10.

Preferably, the shaft 23 of the vacuum chamber 20 is also extended beyond the actuation means 30 via a rod 24 connected to an end stop damper 25 so as to allow the movable contacts 22 of the vacuum switch 20 to close again without bounces.

Figure 2:
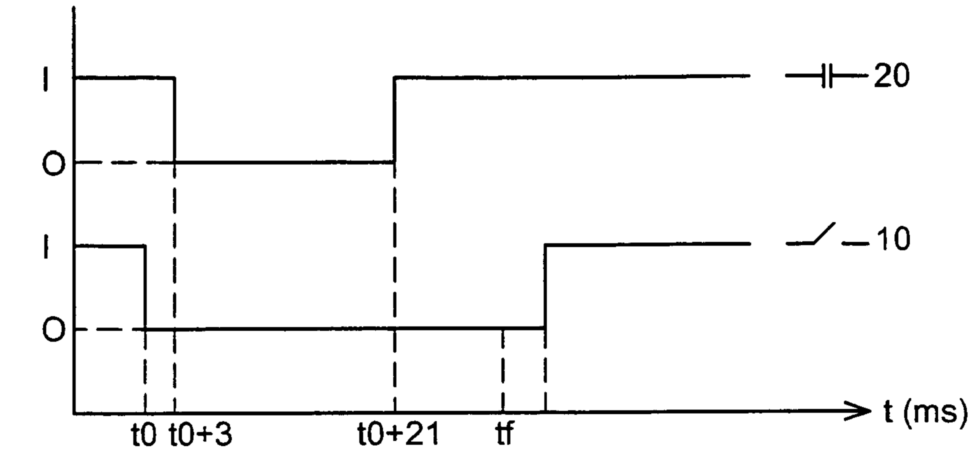
FIG. 2 shows a time diagram of the opening and closing of two cut-out switches of a hybrid circuit breaker in accordance with the invention.

To optimise the operation of the hybrid circuit breaker 1, the movement of the movable contacts 12, 22 preferably follows a time diagram as shown in FIG. 2 (wherein I indicates a closed state and O indicates an open state of the contacts in the cut-out switches 10, 20).

When the hybrid circuit breaker 1 is triggered at $t_0$ to interrupt the current, the command system 40 is implemented to drive the shaft 13 of the interrupting chamber 10 in translation along its axis AA' and to drive the auxiliary shaft 23 in translation along its axis BB' until the contacts 21, 22 of the vacuum switch 20 separate completely.

Preferably, the pair of contacts 11, 12 of the gas switch 10 is laid out to present a pretravel, defined as the distance to be covered by the shaft 13, and therefore by the movable arc contact 12 of the gas switch 10, before it separates from the fixed contact 11. A pretravel of this kind allows the contacts 11, 12 of the gas switch 10 to separate with a certain relative speed, for example of the order of 1.2 m/s to 2.5 m/s. The pretravel is also called the relative starting time distance of the arc contacts 11, 12 of the gas switch 10 and typically corresponds to the mutual overlap distance of the two arc contacts 11, 12 of the cut-out switch 10 in the event of a tulip configuration of the contacts 11, 12 as shown in the diagram in FIG. 1.

The separations between the opening times of the vacuum switch 20 and the interrupting chamber 10, are substantially synchronised, in other words the contacts 11, 12 and 21, 22 separate at the same time. It is preferable for the contacts 21, 22 of the vacuum switch 20 to open slightly after the moment to when the trigger command signal is emitted, after a latency of a few milliseconds, and to advantage, after the pretravel of the gas switch 10. Preferably, this opening time shift is of the order of 3 ms; however, depending on the power of the circuit breaker and depending on the dielectric gas used in the interrupting chamber 10, this shift may assume a different value. Using the actuation means in accordance with the invention, it is easy to make this adjustment, as will be explained below.

Furthermore, in order not to act upon the vacuum switch 20 and to prevent it from needlessly sustaining dielectric constraints, the actuation means 30 according to one of the aspects of the invention allow the contacts 21, 22 of the vacuum switch 20 to close again after a certain time delay, even though the gas switch 10 is not commanded to close: the actuation means 30 are adapted to allow the contacts 21, 22 of the vacuum switch to close while keeping the contacts 11, 12 of the interrupting chamber in the open position. Preferably, the movable contact 22 of the vacuum switch 20 is set in motion about 3 ms after the separation of the contacts 11, 12 of the interrupting chamber, then closed again after 5 to 25 ms, for example 21 ms, after the trigger time to of the circuit breaker 1.

In order not to handle the contacts 21, 22 of the vacuum switch 20 needlessly, once they are closed again, these contacts are preferably no longer actuated in an operation to close the circuit breaker, in other words when the command is given to close the gas switch 10; at the moment $t_f$, for example 100 ms after to, the contacts 11, 12 are actuated, but the contacts 21, 22 remain closed. The interrupting chamber 10 itself closes after a latency inherent to the final gap between the contacts 11, 12; usually, the separation travel of the contacts of the interrupting chamber 10 is of the order of 100 to 250 mm.

To advantage, the same actuation means 30 include a kinematic drive device designed in a way such that the command system 40 is able to be actuated only once at the time $t_0$ so as to command only opening, or to command opening and closure, or respectively at to then at $t_f$, so as to accomplish one or other of the pre-set time cycles. Indeed, the duration between the times $t_o$ and $t_f$ may be equal to a few hundred ms for a rapid opening and closing cycle, but the opening operations may be performed independently of each other over much longer periods of time.

Figure 3A:
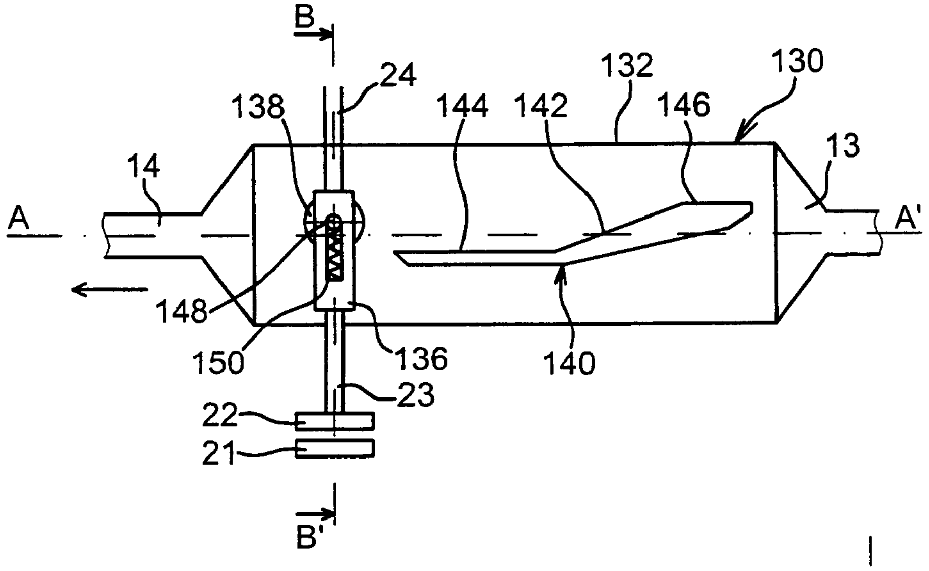
FIGS. 3A to 3F show an embodiment of a hybrid circuit breaker according to the invention in different positions during the opening and closure cycles.
Figure 3B:
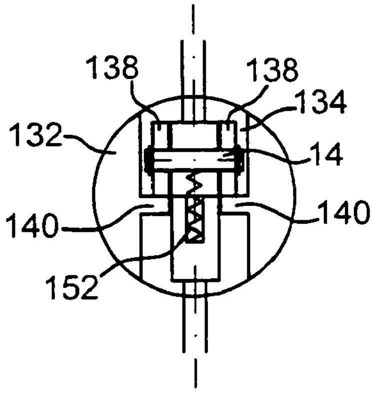

According to one embodiment shown in FIGS. 3A and 3B, the kinematic drive device 130 includes an operating component 132, to advantage tube-shaped, engaging with the two shafts 13, 23 connected to the movable contacts 12, 22 respectively. Preferably, the operating component 132 is connected in a rigid way to the shaft 13 of the gas switch 10; a run 134, in the form of a groove or slit, allows a fixed extension of the shaft 23, and of the rod 24 when it is present, of the vacuum switch 20 to slide along the displacement axis AA' of the operating component 132.

In this embodiment, the kinematic drive device 130 includes a rod 136 connected in a fixed way to the shaft 23 of the vacuum switch 20 and which is able to slide along the run 134 of the operating component 132. The movement to open the vacuum switch 20 is performed by means of a component 138 mounted to slide in the rod 136 along the axis BB' and engaging with a part 140 of the operating tube 132, said part 140 being located in the run 134.

As is shown in FIGS. 3A and 3B, the part 140 of the operating component 132 may include at least one ramp or one guide projecting inside the run 134, and preferably two. The ramp 140 has a portion 142 inclined relative to the axis of displacement AA' of the operating component 132. Preferably, the ramp 140 is fitted with two arms parallel to the longitudinal axis AA' of displacement and located on either side of the inclined portion 142: the first arm 144 located forwards from the inclined portion 142 in the direction of opening of the interrupting chamber 10, allows a progressive engagement with the component 138 of the rod 136 engaging with the guide 140; furthermore, as will become clear subsequently, the front arm 144 also acts as an action delaying means in opening the vacuum chamber 20, depending on its size. The second arm 146 is located on the opposite side from the first one and also makes it possible to dimension the opening time of the vacuum chamber 20. However, an appropriate positioning and a corresponding dimensioning of the length of the inclined portion 142 and of its angle of inclination may make one of the arms 144, 146, or both of them, superfluous.

The component 138 engaging with the ramp 140 may present itself in the form of at least one roller projecting laterally relative to the rod 136. The rollers 138 are supported by a pin 148 passing through a groove 150 provided in the rod 136, so as to be able to slide in the rod 136 along the axis BB' of displacement of the movable contact 22 of the vacuum switch 20. The rollers 138 are held in their rest position, in which they are liable to be engaged by the ramp 140, through means forming a spring, for example a spring 152 placed in a channel of the rod 136.

Figure 3C:
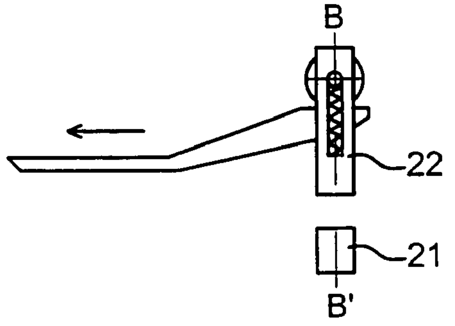

The displacement of the rod 136 is shown in FIGS. 3C-3F, which are purely diagrammatic: in particular, the representation of the contacts 21, 22 is highly simplified. When the command system 40 displaces the shaft 13 of the interrupting chamber 10, each ramp 140 engages itself with a roller 138 (FIG. 3A). The first arm 144 allows the shaft 13 to continue its displacement while leaving the shaft 23 immobile; the rollers 138 slide along the ramp 140 in the run 134 provided in the operating component 132. Once the rollers 138 reach the inclined portion 142, the rollers 138 are forced to move away from the fixed contact 21 by the ramp 140 along the second axis BB', and they drive the rod 136 and the shaft 23: the movable contact 22 of the vacuum switch 20 opens (FIG. 3C). The travel of the movable contact 22 of the vacuum switch 20 is equal to the length of the projection of the ramp 140 on the axis BB', for example about 25 mm.

Figure 3D:
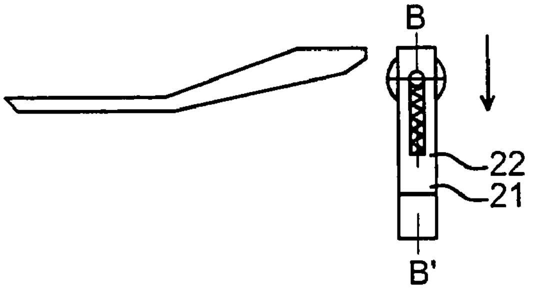

Once the roller 138 passes beyond the end of the ramp 140 nearest to the gas switch 10, it is no longer acted upon. Given, inter alia, the vacuum prevailing in the switch 20, the movable contact 22 is returned towards the fixed contact 21, the shaft 23 and the rollers 138 resume their rest position (FIG. 3D). Preferably, the cushioning means 25 (see FIG. 1) allow a controlled closure of the contacts 21, 22 of the vacuum switch 20.

Figure 3E:
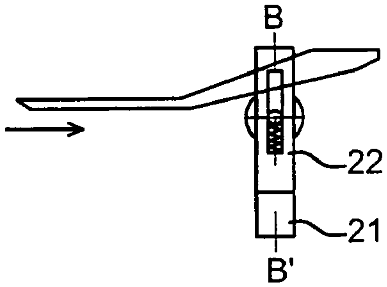
Figure 3F:
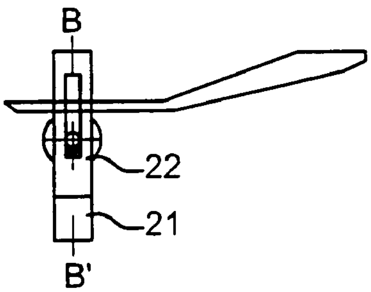

At the time $t_f$ of commanding the closure and reactivation of the gas switch 10, the shaft 13 is displaced in the reverse direction along the axis AA' (towards the right in FIG. 3E). The surface of the ramp 140 turned towards the switch 20 engages the rollers 138 and acts upon them in a direction of closure of the contacts 21, 22: the pin 148 of the rollers 138 slides therefore in the groove 150 along the axis BB' of the chamber 136, and the contacts 21, 22 of the vacuum switch 20 remain in the closed position during the closure of the interrupting chamber 10 (FIG. 3F). Once the end of the ramp 140 furthest away from the cut-out switch 10 is exceeded by an over-travel of the interrupting chamber 10, the spring 152 returns the rod 138 to its initial position (FIG. 3A): the circuit breaker 1 is thus ready for another cycle.

Figure 4:
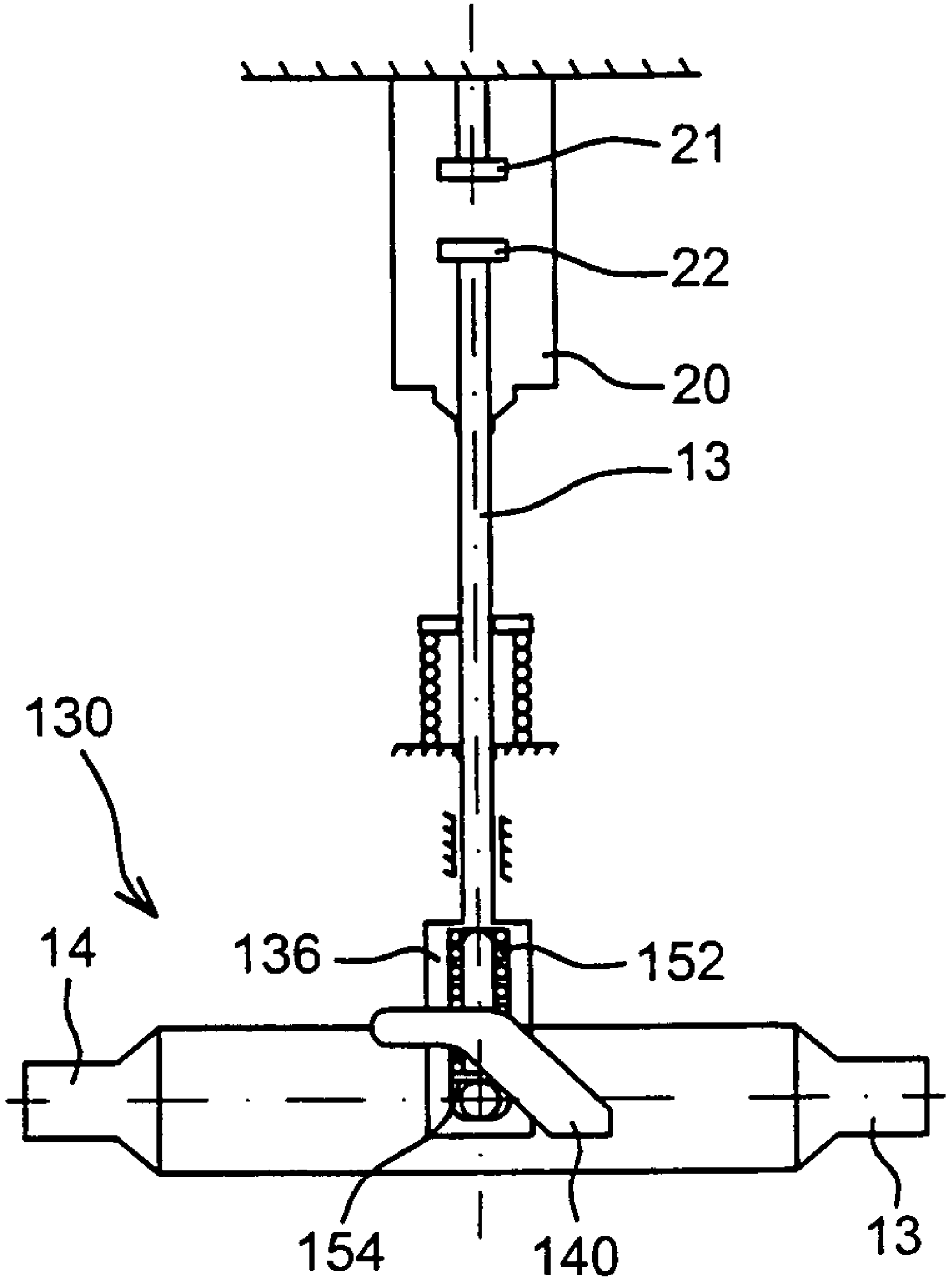
FIG. 4 shows an alternative to the embodiment in FIG. 3.

It is clear that the layout with rollers 138 is only one embodiment: for example, it is possible to replace the rollers 138 which project from the rod 136 by a sliding plate 154 as shown a diagram in FIG. 4. The operation is similar, with an engagement between a single guide 140 for example and the plate 154.

According to one alternative shown in FIG. 5, the shaft 23 is connected directly to the kinematic drive device 230: the operating component 232 is fitted with a run 234 allowing one end 236 of the shaft 23 to slide along the axis BB'. The end 236 of the shaft 23 may be a protuberance of greater size than the run 234, for example in the form of a pivot with rollers, or a sliding pin, or any other alternative.

Similarly (FIG. 5A), the operating component 232 is fitted with a projecting part 240, in the form of a pawl. The pawl 240 is connected in a rotary way with the operating component 232 by means of a pivot 242. The pawl 240 may consist of a single retractable pin, or include action delaying means 244, in a similar way to FIGS. 3 and 4. Stop means 246 provided on the operating component 232 only allow the pawl 240 to rotate in one direction (anticlockwise in FIG. 5) so as to be able to engage actively with the end 236 of the shaft 23, and to drive it in the direction of opening the cut-out switch 20 along its axis BB'.

Figure 5A:
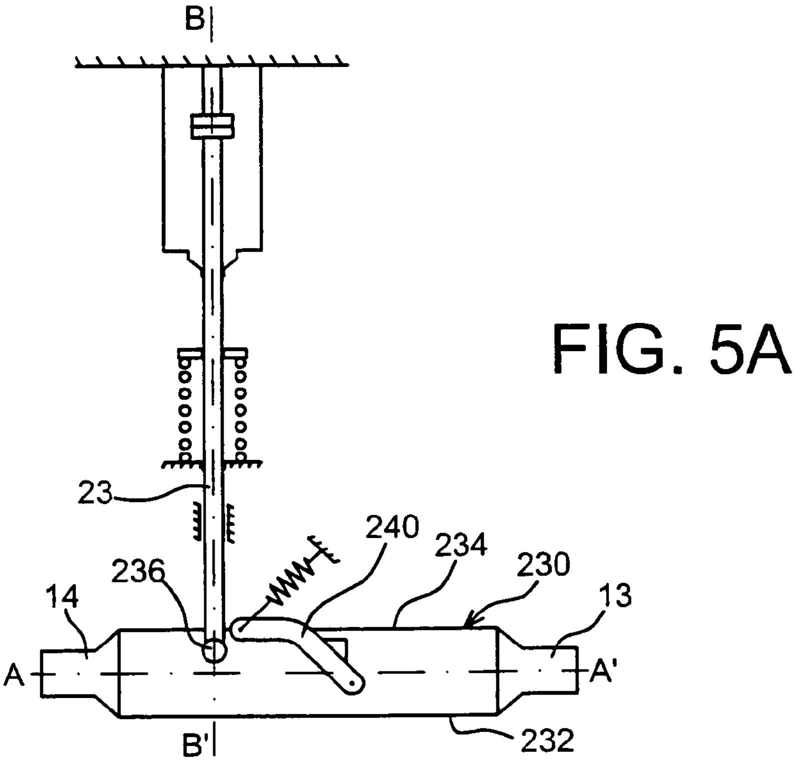
FIGS. 5A to 5D show an alternative to the embodiment in FIG. 3.
Figure 5B:
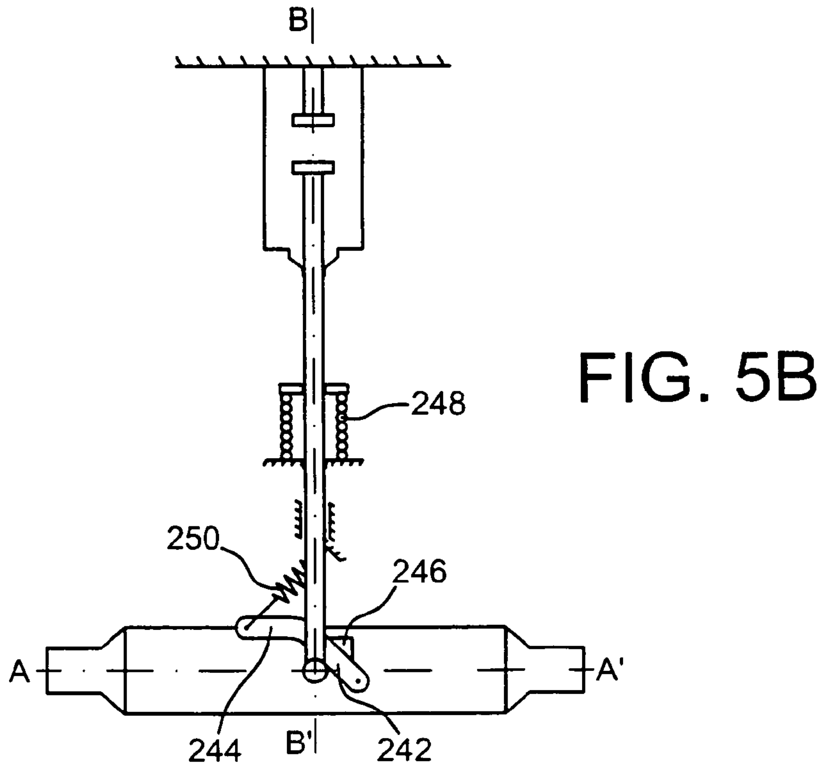
Figure 5C:
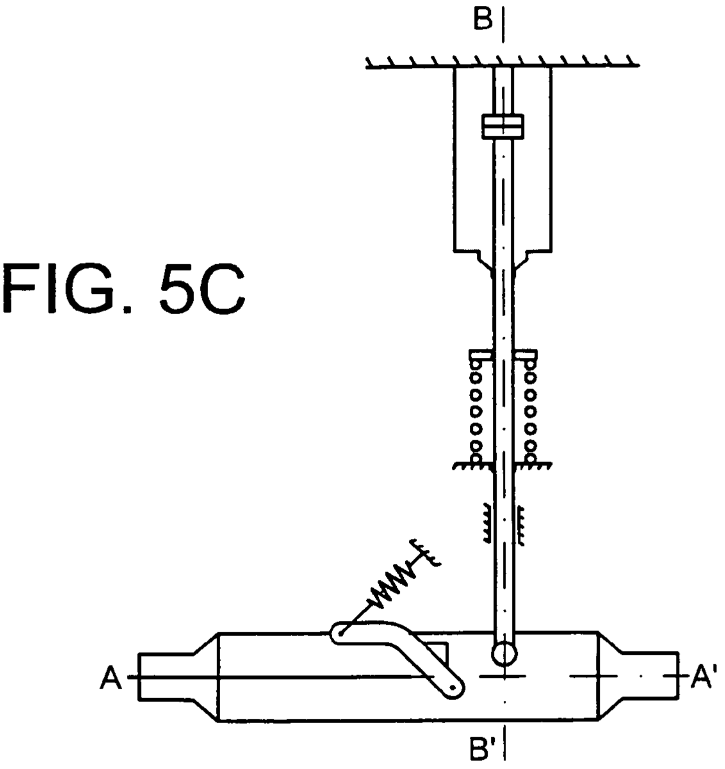

When the command system displaces the shaft 13 in the direction of opening the contact 10, the pawl mechanism 240 is displaced longitudinally with the operating component 232 along the axis AA' and engages with the sliding pin forming the end 236 of the axis 23 (FIG. 5B). After a certain pretravel equivalent to the length of the action delaying arm 244 and to the distance separating its front end from the sliding pin 236, the pawl mechanism 240, locked by the stop 246, forces the sliding pin 236 to be displaced longitudinally moving away from the cut-out switch 20 along the axis BB', and therefore drives the opening of the vacuum switch 20. Once the sliding pin 236 has reached the level of the pivot 242, it is no longer acted upon by the pawl 240. Given the vacuum prevailing in the vacuum switch 20, the vacuum switch closes again (FIG. 5C).

To advantage, in order to assist the action of the vacuum during the closure of the vacuum switch 20, the circuit breaker includes return means 248 able to displace the movable contact 22 towards the fixed contact 21 so as to close the interrupter 20 again. These means may take the form of a compression spring 248 interposed between the shaft 23 and a fixed stop. The spring 248 is preferably pre-stressed and provides for example a stress of 3600 kN between the two contacts. During the opening of the vacuum switch 20 (FIG. 5B), the spring 248 is compressed. As soon as the end 236 of the shaft 23 is free, the force of the spring 248 allows the shaft 23 to be displaced along the axis BB': this allows a better controlled and rapid closure of the vacuum switch 20, while acting less upon the tightness of this envelope 20.

The return means 248 may clearly be provided also in the embodiments outlined previously (see in addition FIGS. 1 and 4). The location of the spring 248 is only illustrative: for example, it is possible to provide a return spring in the damper 25, or acting upon the rod 24. In particular, as shown in the diagram in FIG. 1, the return spring 48 may be compressed at the end of the rod 24 by a piston, at a pressure of about 10 bars for example, and become active when pressure is lost, which additionally allows power to be saved at each operation.

Just like the ramp 140, the engagement part of the pawl 240 is calibrated in such a way that the separation travel of the contacts covers to advantage from 12 to 25 mm, for a separation speed of 1.2 to 2.5 m/s.

Figure 5D:
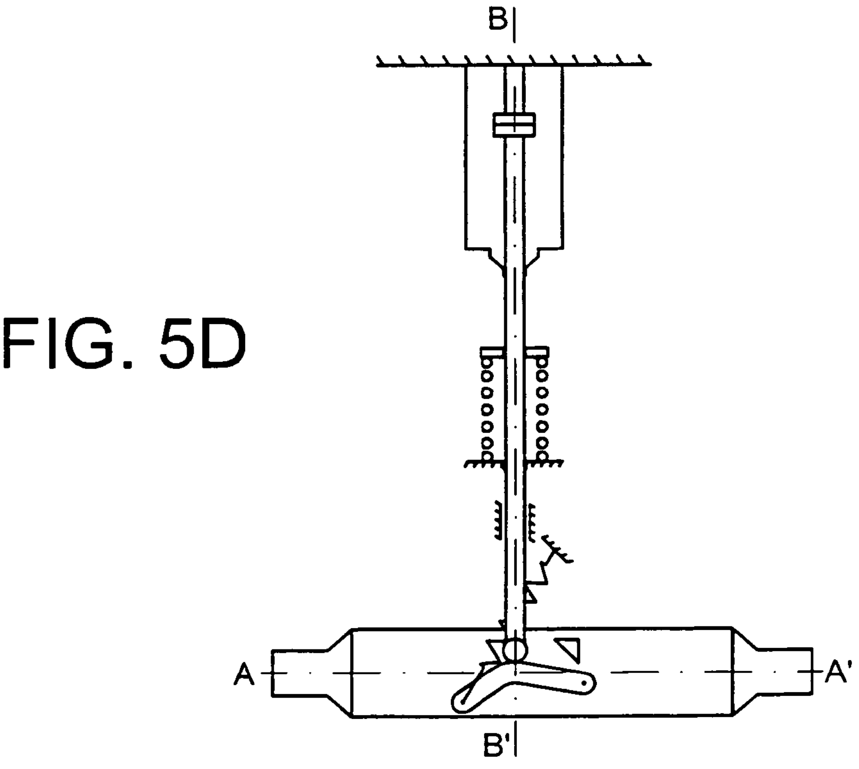

During the closure of the gas switch 10, the shaft 13 is displaced in the reverse direction. The sliding pin forming the end 236 of the shaft 23 of the vacuum switch 20 is brought into contact with the upper surface of the pawl 240, which is supported on the stop 246 (FIG. 5D). During the displacement, the pawl 240 is thus subject to rotation around its pivot 242, in an anticlockwise direction in FIG. 5D, whereas the shaft 23 of the vacuum switch 20 is not acted upon. To advantage, the pawl mechanism 240 includes return means 250, such as an extension spring, allowing it to resume its initial position once the sliding pin 236 has passed. The circuit breaker is thus ready for another cycle.

These embodiments are straightforward to implement and utilise few additional parts relative to existing actuation means. To be completely free however of the pressure effect in the interrupting chamber in respect of closing the vacuum switch, another embodiment is conceivable, as shown in the diagrams in FIG. 6.

The two longitudinal shafts 13, 23 are here connected by means of a gear system 330. In particular, the end of the shaft 13 is connected, by means of a connecting rod 332, to a first wheel 334 the axis of which is perpendicular to the axes AA' and BB' and carried by the sheath of the circuit breaker. This layout generates a rotational movement of the first wheel 334 during the longitudinal displacement of the shaft 13 along the axis AA'. The connecting rod 332 is connected to the wheel 334 making a non-nil angle $\theta_0$ between the axis AA' and the radius of the wheel 334 passing through the articulation of the connecting rod 332 thereon. During the maximum opening of the contacts 11, 12 of the interrupting chamber 10, in other words for the maximum travel of the shaft 13 (for example 25 mm) and of the connecting rod 332, the wheel 334 is displaced between the initial position (FIG. 6A) and a final position $\theta_m$ (FIG. 6E) in which less than one half turn has been made by the wheel 334. Generally speaking, the connecting rod 332 rotates the first wheel 334 by $\theta_m-\theta_0=60°$ in 20 ms.

A gear 336, in the form of a second wheel engages on the first wheel 334. The axis of the second wheel 336, parallel to that of the first wheel 334, is carried by the sheath of the circuit breaker. The second wheel 336 is calibrated to rotate by 360° around its axis at each command system opening cycle, in other words to make a complete revolution when the first wheel 334 goes through its maximum travel $\theta_m-\theta_0$. The second wheel 336 is connected by a second connecting rod 338 to the shaft 23 of the vacuum switch 20. To advantage, the connection between the shaft 23 and the connecting rod 338 is made by means of an aperture 340 acting as an action delaying means between the movements of the connecting rod 338 and of the shaft 23 so as to shift the separation of the contacts by 3 ms. Alternatively, the aperture may be located on the second wheel 336.

Additionally, an anti-return means 342 (FIG. 6F) is mounted on the gear 334, 336: the anti-return means 342 allows the wheel 336 to rotate only during the opening operation and disengages the two wheels when the first one makes a movement due to the closure of the interrupting chamber 10.

Figure 6B:
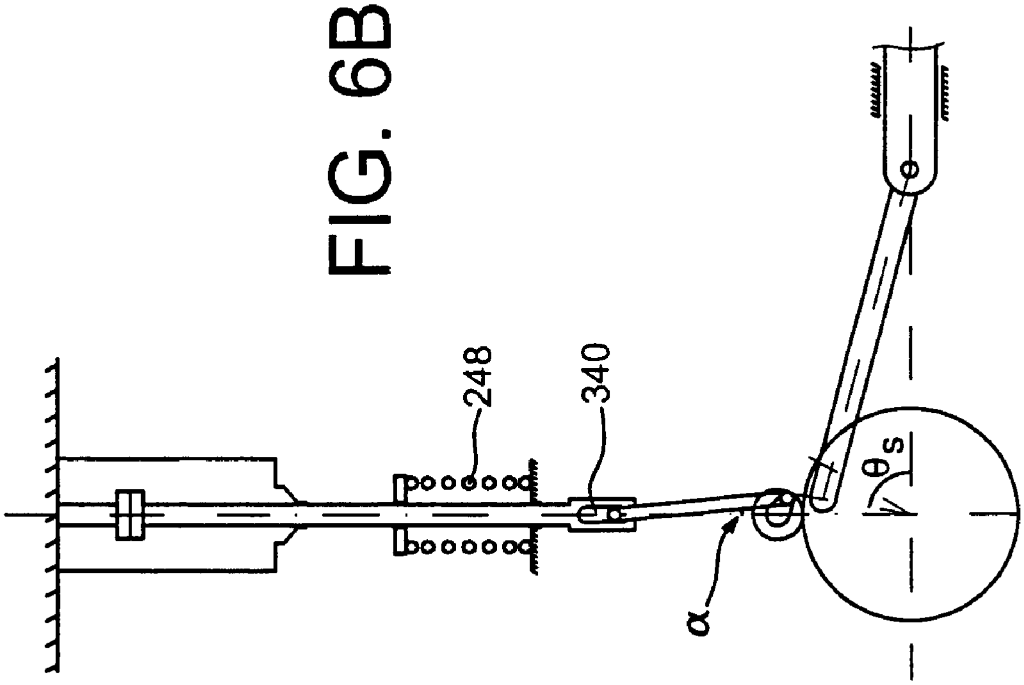
FIGS. 6A to 6F show another embodiment of a hybrid circuit breaker according to the invention, at different times during the opening and closure cycles.
Figure 6A:
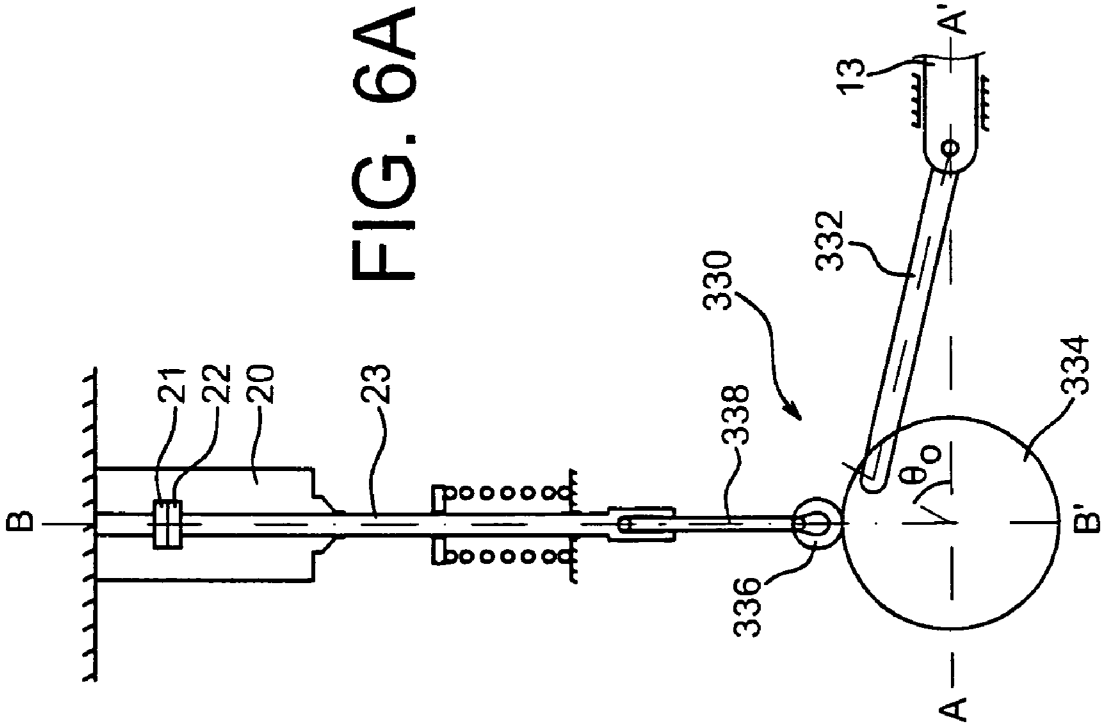
Figure 6D:
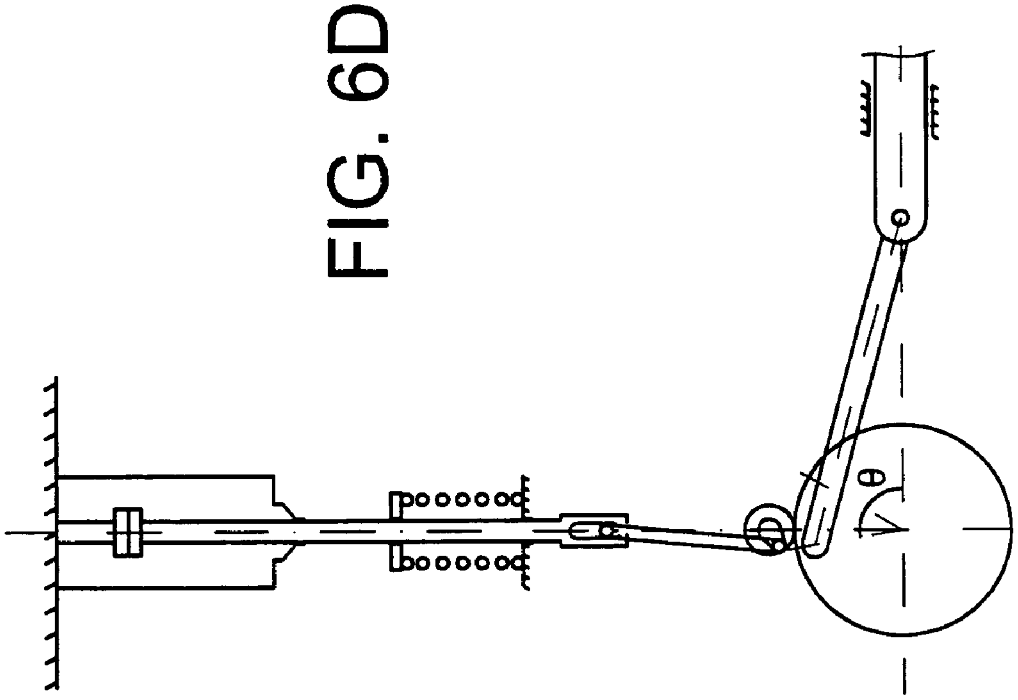

The second wheel 336 is at rest (when the two cut-out switches are closed) in the 0° position, in other words such that the connecting rod 338 and the shaft 23 are aligned, and in which the distance between the movable contact 22 and the point of connection of the connecting rod 338 and of the second wheel 336 is minimal. By calling $\theta_s$ the angle between the axis AA' and the radius of the wheel 334 passing through the articulation of the connecting rod 332 thereon corresponding to the separation of the contacts 11, 12, the separation movement can be broken down as follows:

During the pretravel of the movable contact 12, the first wheel 336 is displaced on an arc $[\theta_0, \theta_s]$, the second wheel 336 goes from 0° to $\alpha$: the aperture 340 prevents the displacement of the vacuum switch 20 (FIG. 6B).

Figure 6C:
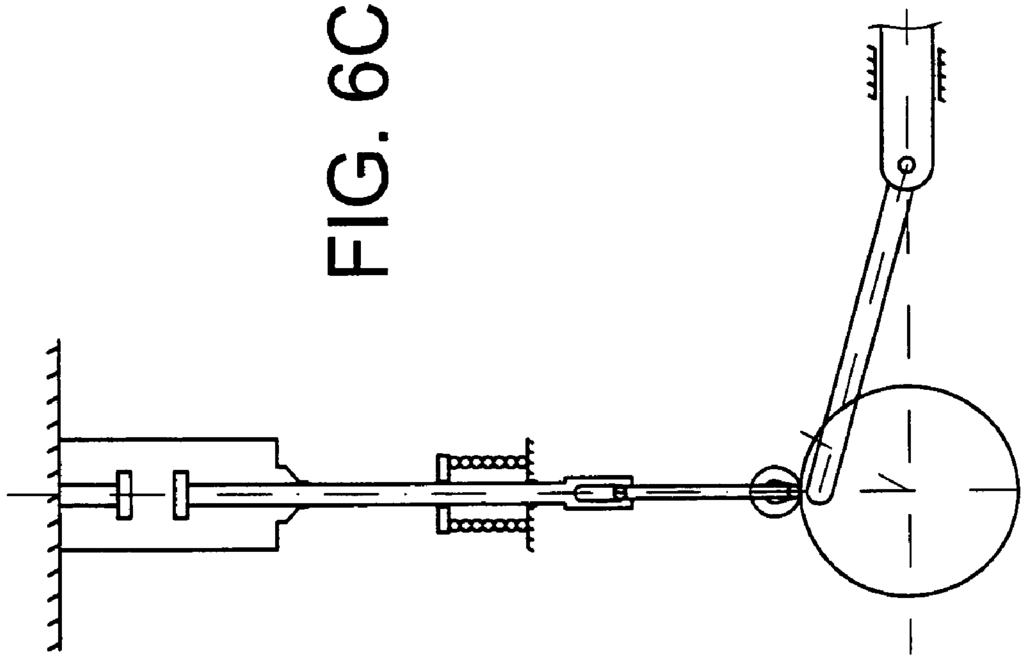
Figure 6F:
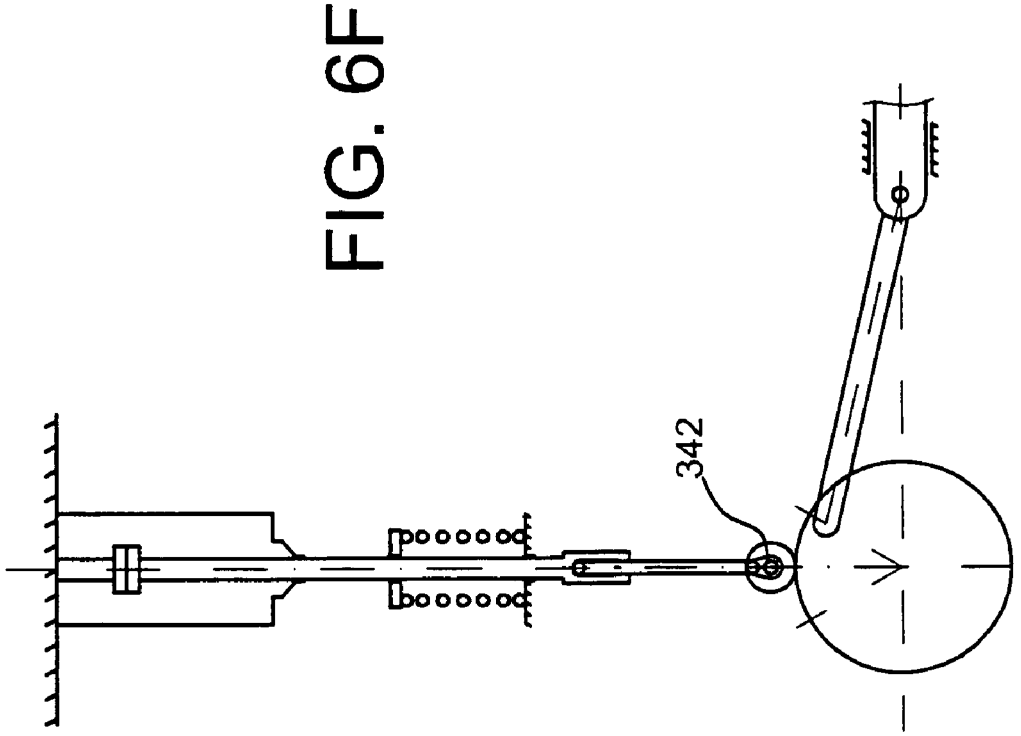
Figure 6E:
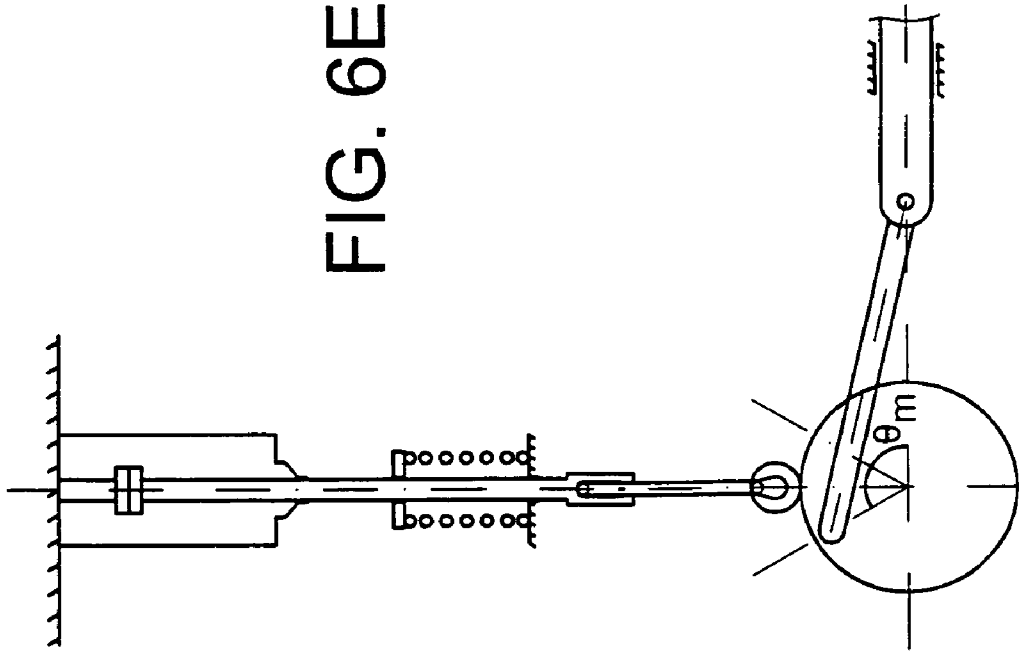

During the opening of the interrupting chamber 10, the first wheel turns along an arc $[\theta_s, 90°]$, the second wheel turns along an arc $[\alpha, 180°]$; the vacuum switch opens (FIG. 6C).

When the interrupting chamber 10 continues its opening movement with the first wheel 334 displacing itself between 90° and $\theta_m$, the second wheel 336 rotates between 180° and 360°, which involves a change in the direction of movement of the shaft 23 (FIGS. 6D-6E): the pressure difference and/or the return spring 248 of the vacuum switch 20 give the necessary power to close the interrupter. The surplus power is provided to the interrupting chamber 10 by the gear system 330.

During the closure of the circuit breaker (FIG. 6F), the vacuum switch 20 does not move since the anti-return system 342 prevents the second wheel 326 from turning.

To advantage, the initial 180° rotation of the first wheel 334 is performed in an order of magnitude of 10 ms and during this period the vacuum switch covers 12 to 25 mm, which gives a speed greater than 2.5 m/s for an opening of 25 mm.

Clearly, other layouts are possible to implement the actuation means. Furthermore the embodiments may be combined.

The invention claimed is:

1. Hybrid circuit breaker including:

a first cut-out switch including a first pair of contacts wherein a first movable contact may be displaced along a first axis between a closed position and an open position of the first pair of contacts, a second cut-out switch including a second pair of contacts wherein a second movable contact may be displaced along a second axis between a closed position and an open position of the second pair of contacts, actuation means displacing, under the action of a single command, said first and second movable contacts between a closed position and an open position, which are adapted, during the opening phase of the circuit breaker, to open the first and the second pair of contacts, then to reclose the second pair of contacts while keeping the first pair open.

2. Circuit breaker according to claim 1 wherein the actuation means include means for delaying the opening of the second pair of contacts relative to the single command.

3. Circuit breaker according to claim 2 wherein the action delaying means are adapted to open the second pair of contacts after the opening of the first pair of contacts, preferably 3 ms afterwards.

4. Circuit breaker according to claim 1 wherein the actuation means are additionally adapted to then reclose the first pair of contacts while keeping the second pair closed.

5. Circuit breaker according to claim 1 including a return means acting upon the second pair of contacts in the direction of closure.

6. Circuit breaker according to claim 5 wherein the return means includes a mechanical spring independent of said actuation means.

7. Circuit breaker according to claim 1 wherein the first cut-out switch is a gas interrupting chamber and/or the second cut-out switch is a vacuum interrupter.

8. Circuit breaker according to claim 1 wherein the first and second axes are substantially perpendicular.

9. Hybrid circuit breaker including:

a first cut-out switch including a first pair of contacts wherein a first movable contact may be displaced along a first axis between a closed position and an open position of the first pair of contacts, a second cut-out switch including a second pair of contacts wherein a second movable contact may be displaced along a second axis between a closed position and an open position of the second pair of contacts, actuation means displacing, under the action of a single command, said first and second movable contacts between an open position and a closed position which are adapted, during the closure phase of the circuit breaker, to keep the second pair of contacts closed when the first pair of contacts moves from the open position to the closed position.

10. Circuit breaker according to claim 9 wherein the first cut-out switch is a gas interrupting chamber and/or the second cut-out switch is a vacuum interrupter.

11. Circuit breaker according to claim 1 wherein the actuation means include an operating component connected in a fixed way to the first movable contact, and a component connected to the second movable contact and engaging with the operating component so as to be able to be displaced along the first axis.

12. Circuit breaker according to claim 11 wherein the component connected to the second movable contact includes a protuberance formed on a shaft connected to the second movable contact and extending in the direction of the second axis, said protuberance sliding in the operating component.

13. Circuit breaker according to claim 12 including a mechanism forming a pawl liable to engage the sliding protuberance.

14. Circuit breaker according to claim 13 wherein the mechanism forming a pawl is rotational around the pivot connected to the operating component and fitted with a stop.

15. Circuit breaker according to claim 14 wherein the mechanism forming a pawl includes an action delaying arm parallel to the axis of displacement of the operating component, in the rest position.

16. Circuit breaker according claim 14 wherein the mechanism forming a pawl includes return means.

17. Circuit breaker according to claim 11 wherein the component connected to the second movable contact includes a rod which supports a component mounted to slide along the second axis.

18. Circuit breaker according to claim 17 wherein the rod includes means for the return of the sliding component.

19. Circuit breaker according to claim 17 wherein the operating component includes a projecting part liable to engage with the sliding component.

20. Circuit breaker according to claim 19 wherein the projecting part includes a ramp inclined relative to the axis of displacement of the first movable contact.

21. Circuit breaker according to claim 20 wherein the projecting part includes an action delaying arm.

22. Circuit breaker according to claim 11 additionally including a closure damper of the first cut-out switch.

23. Circuit breaker according to claim 9 wherein the actuation means include an operating component connected in a fixed way to the first movable contact, and a component connected to the second movable contact and engaging with the operating component so as to be able to be displaced along the first axis.

24. Circuit breaker according to claim 1 wherein the actuation means include a gear.

25. Circuit breaker according to claim 24 wherein the gear includes a first wheel connected by means of a first connecting rod to the first movable contact so that the displacement of the first movable contact in the longitudinal direction drives the rotation of the first wheel.

26. Circuit breaker according to claim 25 wherein the complete travel of the first movable contact drives the rotation of the first wheel over 60°.

27. Circuit breaker according to claim 25 wherein the gear includes a second wheel connected by means of a second connecting rod to the second movable contact.

28. Circuit breaker according to claim 27 wherein the complete travel of the first movable contact drives the rotation of the second wheel over 360°.

29. Circuit breaker according to claim 27 wherein the second connecting rod and/or the second wheel include action delaying means.

30. Circuit breaker according to claim 27 wherein the gear includes an anti-return system such that the rotation of the second wheel can only be performed in one direction.

31. Circuit breaker according to claim 9 wherein the actuation means include a first wheel connected by means of a first connecting rod to the first movable contact so that the displacement of the first movable contact in the longitudinal direction drives the rotation of the first wheel and a second wheel connected by means of a second connecting rod to the second movable contact.

* * * * *